(12) United States Patent
Bestgen et al.

(10) Patent No.: US 9,378,235 B2
(45) Date of Patent: *Jun. 28, 2016

(54) MANAGEMENT OF UPDATES IN A DATABASE SYSTEM

(71) Applicant: International Business Machines Corporation, Armonk, NY (US)

(72) Inventors: Robert J. Bestgen, Rochester, MN (US); Daniel E. Beuch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/833,016

(22) Filed: Mar. 15, 2013

(65) Prior Publication Data

US 2014/0258251 A1  Sep. 11, 2014

Related U.S. Application Data

(63) Continuation of application No. 13/793,216, filed on Mar. 11, 2013.

(51) Int. Cl.
*G06F 17/30* (2006.01)
(52) U.S. Cl.
CPC .... *G06F 17/30336* (2013.01); *G06F 17/30442* (2013.01)
(58) Field of Classification Search
CPC ............... G06F 17/30289; G06F 17/30424; G06F 17/30575; G06F 17/30312; G06F 17/30321
USPC .................................. 707/609, 610, 618, 696
See application file for complete search history.

(56) References Cited

U.S. PATENT DOCUMENTS

| | | | |
|---|---|---|---|
| 5,535,385 A | 7/1996 | Griffin et al. | |
| 5,826,257 A | 10/1998 | Snelling, Jr. | |
| 5,926,813 A | 7/1999 | Chaudhuri et al. | |
| 5,950,186 A | 9/1999 | Chaudhuri et al. | |
| 6,026,406 A | 2/2000 | Huang et al. | |
| 6,047,298 A | 4/2000 | Morishita | |
| 6,098,075 A | 8/2000 | Becraft, Jr. et al. | |
| 6,651,075 B1 | 11/2003 | Kusters et al. | |

(Continued)

FOREIGN PATENT DOCUMENTS

EP     2144177 A2    1/2010

OTHER PUBLICATIONS

Bestgen, R., et al., "Management of Searches in a Database System", U.S. Appl. No. 13/833,288, filed Mar. 15, 2013.

(Continued)

*Primary Examiner* — Monica Pyo
(74) *Attorney, Agent, or Firm* — Feb R Cabrasawan; Nicholas D. Bowman

(57) ABSTRACT

A method, system, and computer program product to efficiently maintain a database is disclosed. The method, system, and computer program product may include structuring the database to have a table, an index associated with the table, and a log associated with the index. The method, system, and computer program product may include receiving a maintenance request related to the index. The method, system, and computer program product may include accounting for the maintenance request when the index is being searched. The method, system, and computer program product may include adding the maintenance request to the log when the index is not being searched.

8 Claims, 4 Drawing Sheets

(56) References Cited

U.S. PATENT DOCUMENTS

| | | | |
|---|---|---|---|
| 6,675,157 B1 | 1/2004 | Mitchell | |
| 7,490,084 B2 | 2/2009 | Kothuri et al. | |
| 7,593,341 B1 | 9/2009 | Buriol et al. | |
| 7,644,107 B2 | 1/2010 | Neagovici-Negoescu et al. | |
| 8,032,503 B2 | 10/2011 | Bouloy et al. | |
| 8,140,495 B2 | 3/2012 | Carlin et al. | |
| 8,161,015 B2 | 4/2012 | Kennedy et al. | |
| 8,352,422 B2 * | 1/2013 | Prahlad et al. | 707/609 |
| 8,504,758 B1 | 8/2013 | McHugh et al. | |
| 8,615,507 B2 | 12/2013 | Varadarajulu et al. | |
| 9,189,506 B2 | 11/2015 | Gao et al. | |
| 2002/0052872 A1 | 5/2002 | Yada | |
| 2002/0198867 A1 | 12/2002 | Lohman et al. | |
| 2003/0037042 A1 | 2/2003 | Kametani | |
| 2003/0126116 A1 | 7/2003 | Chen et al. | |
| 2003/0217033 A1 * | 11/2003 | Sandler | G06F 17/30333 |
| 2005/0283485 A1 | 12/2005 | Blaicher et al. | |
| 2007/0124303 A1 | 5/2007 | Dettinger et al. | |
| 2007/0174309 A1 | 7/2007 | Pettovello | |
| 2007/0280199 A1 | 12/2007 | Rong | |
| 2008/0077584 A1 | 3/2008 | Bachmann et al. | |
| 2008/0098020 A1 | 4/2008 | Gupta et al. | |
| 2009/0055638 A1 | 2/2009 | Nakano et al. | |
| 2009/0063400 A1 | 3/2009 | Borkar et al. | |
| 2009/0064160 A1 | 3/2009 | Larson et al. | |
| 2009/0210413 A1 | 8/2009 | Hayashi et al. | |
| 2010/0036864 A1 | 2/2010 | Augenstein et al. | |
| 2010/0106682 A1 | 4/2010 | Pauly | |
| 2010/0161553 A1 | 6/2010 | Park et al. | |
| 2011/0071986 A1 | 3/2011 | Schmidt et al. | |
| 2011/0145188 A1 | 6/2011 | Vachuska | |
| 2012/0016881 A1 | 1/2012 | Hrle et al. | |
| 2012/0136869 A1 | 5/2012 | Kaufmann et al. | |
| 2013/0185281 A1 | 7/2013 | Joppa et al. | |
| 2013/0268498 A1 | 10/2013 | Sisco et al. | |
| 2013/0275367 A1 | 10/2013 | Shuma et al. | |
| 2013/0318131 A1 | 11/2013 | Reisman | |
| 2014/0172783 A1 * | 6/2014 | Suzuki et al. | 707/609 |

OTHER PUBLICATIONS

Bestgen, R., et al, "Management of Updates in a Database System", U.S. Appl. No. 13/793,216, filed Mar. 11, 2013.

Bestgen, R., et al., "Database Management Delete Efficiency", U.S. Appl. No. 13/795,262, filed Mar. 12, 2013.

Bestgen, et al., "Database Management Delete Efficiency". U.S. Appl. No. 13/763,971, filed Feb. 11, 2013.

Bestgen, et al., "Management of Searches in a Database System", filed Mar. 11, 2013.

Graefe, G., "Sorting and Indexing with Partitioned B-Trees", Proceedings of the 2003 CIDR Conference, pp. 1-13.

RD 303005 A, Jul. 10, 1989.

* cited by examiner

MANAGEMENT OF UPDATES IN A DATABASE SYSTEM

CROSS-REFERENCE TO RELATED APPLICATIONS

This application is a continuation of co-pending U.S. patent application Ser. No. 13/793,216 filed Mar. 11, 2013. The aforementioned related patent application is herein incorporated by reference in its entirety.

TECHNICAL FIELD

This disclosure relates generally to computing systems and, more particularly, relates to database management systems.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. A database administrator may desire to maintain the database by adding, deleting, or changing a record in the database. The database may need to be available for queries. It may be desirable for maintenance to be performed efficiently.

SUMMARY

A method, system, and computer program product to efficiently maintain a database is disclosed. The method, system, and computer program product may include structuring the database to have a table, an index associated with the table, and a log associated with the index. The method, system, and computer program product may include receiving a maintenance request related to the index. The method, system, and computer program product may include accounting for the maintenance request when the index is being searched. The method, system, and computer program product may include adding the maintenance request to the log when the index is not being searched.

Aspects of the disclosure may include structuring a database that may include one or more tables and one or more indexes. Aspects of the disclosure may promote efficient index maintenance. Aspects of the disclosure may make access to indexes more predictable. Aspects of the disclosure may "batch-up" index maintenance, performing multiple additions, deletions, or changes at once. Aspects of the disclosure may include a log associated with the index. Aspects of the disclosure may include the log adapted to include an entry. Aspects of the disclosure may include sorting or ordering entries of the log associated with the index. Aspects of the disclosure may reduce a working set memory size. Aspects of the disclosure may reduce I/O on indexes. Aspects of the disclosure may reduce overall I/O of index maintenance operations. Aspects of the disclosure may reduce CPU consumption.

DETAILED DESCRIPTION

Figure 1:
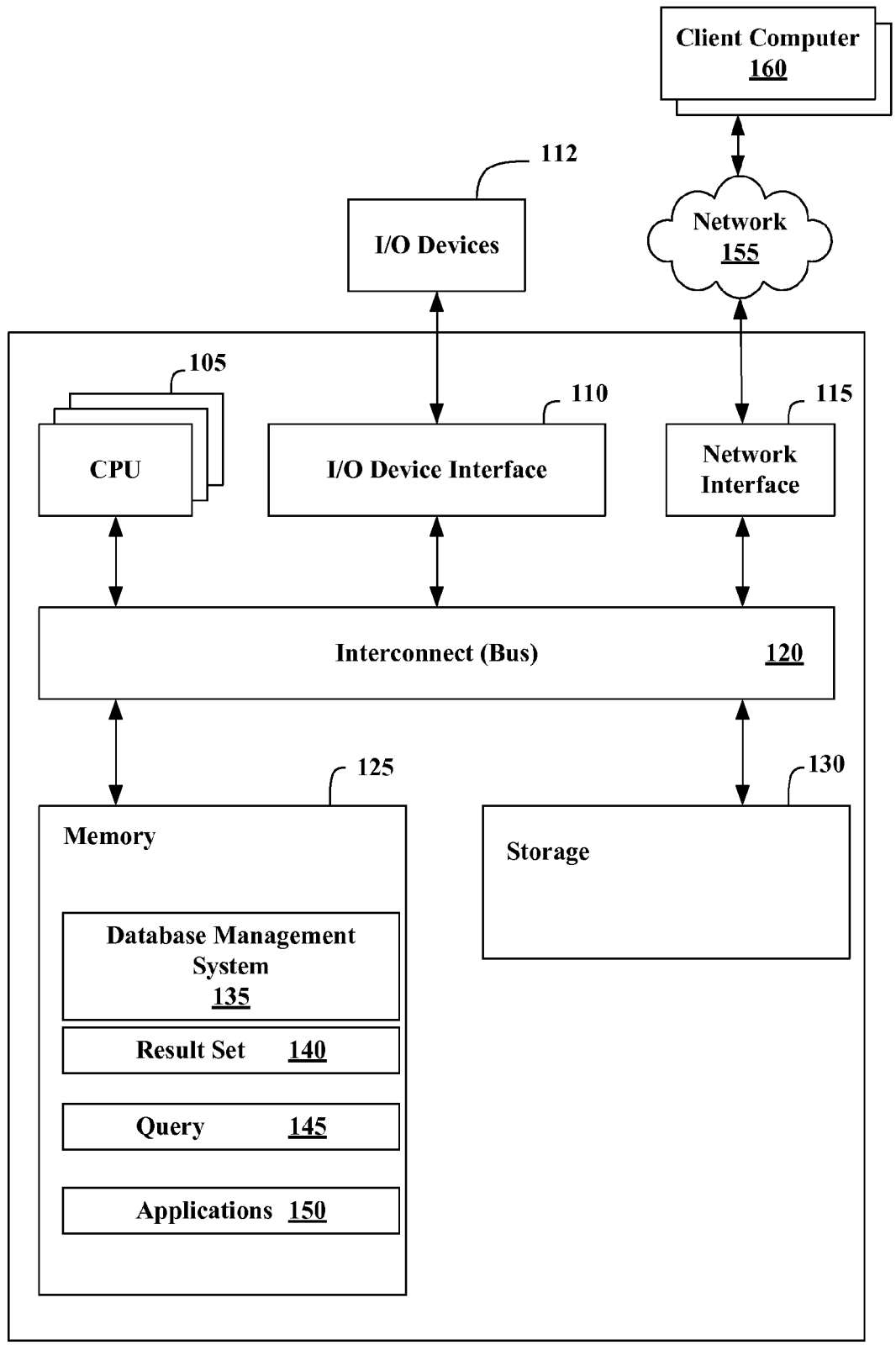
FIG. 1 illustrates an example representation of a computer system connected to a client computer via a network according to an embodiment.

A database administrator may desire to maintain the database by adding, deleting, or changing a record in the database. The database administrator may have a small maintenance window. Maintaining a large amount of data may take an amount of time and performance overhead that is not insignificant. The maintenance may need to occur in real-time while applications remain active, available for a search. It may be desirable for the search to occur with performance not negatively impacted by maintenance activities. It may be desirable for maintenance to be performed efficiently.

A time-consuming aspect of maintenance may be index maintenance. In adding, deleting, or changing one or more rows from a table, indexes associated with the one or more rows may be updated. Index maintenance may enable the indexes to remain available and updated for searching (i.e., query access). Updated indexes may enable accurate search results.

Significant input-output (I/O) may result from index maintenance depending on factors such as memory size and the size of the indexes over the table. Significant I/O may lead to increased search time. Significant I/O may result in costs to the database administrator such as decreased performance. Decreased performance due to index maintenance may be a performance penalty. Reducing the performance penalty may enable improved search performance which may result from efficient index maintenance.

Aspects of the disclosure may include structuring a database that may include one or more tables and one or more indexes. Aspects of the disclosure may promote efficient index maintenance. Aspects of the disclosure may make access to indexes more predictable. Aspects of the disclosure may "batch-up" index maintenance, performing multiple additions, deletions, or changes at once. Aspects of the disclosure may include a log associated with the index. Aspects of the disclosure may include the log adapted to include an entry. Aspects of the disclosure may include sorting or ordering entries of the log associated with the index. Aspects of the disclosure may include sorting or ordering entries of the log associated with the index as the entries are entered into the log. Aspects of the disclosure may involve ordering the additions, deletions, or changes to be made. Aspects of the disclosure may reduce a working set memory size. Aspects of the disclosure may reduce I/O on indexes. Aspects of the disclosure may reduce overall I/O of index maintenance operations. Aspects of the disclosure may reduce CPU consumption.

Aspects of the disclosure may include receiving a maintenance request. Aspects of the disclosure may include a dynamic logging for indexes over a table when adding, deleting, or changing a row of the table. Aspects of the disclosure may combine a concept of dynamic delayed log maintenance and a concept of ordered log entries before maintenance. Aspects of the disclosure may include determining if an index is being searched. Aspects of the disclosure may include adding to a log associated with the index an addition, a deletion, or a change to be made to the index. Aspects of the disclosure may include delaying adding, deleting, or changing a row of the index when the index is not being searched.

Aspects of the disclosure may include a dynamic determination if an index is being searched. Aspects of the disclosure may include the dynamic determination to conclude the index is not being searched when a query is open that uses the index but the query is not actively searching the index.

Aspects of the disclosure may include settings automatically determined by a database management system (DBMS). Aspects of the disclosure may include settings configured by a user such as a database administrator. Aspects of the disclosure may include a triggering event. Aspects of the disclosure may include occurrence of the triggering event initiating performing index maintenance. Aspects of the disclosure may include the triggering event including a temporal element. Aspects of the disclosure may include the triggering event including a predictive element. Aspects of the disclosure may include the predictive element including an application coming online.

Aspects of the disclosure may include determining a size of the log associated with the index. Aspects of the disclosure may include reducing delays associated with the size of the log associated with the index. Aspects of the disclosure may include setting a maximum log size. Aspects of the disclosure may include leveraging a background daemon to monitor log sizes and automatically perform maintenance upon a log size threshold being reached.

Aspects of the disclosure may include a refresh period of the log associated with the index. Aspects of the disclosure may include managing an amount of time the index is not current. Aspects of the disclosure may include setting a maximum amount of time the index is not current. Aspects of the disclosure may include leveraging a background daemon to monitor the amount of time the index is not current and automatically perform maintenance upon a time threshold being reached.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
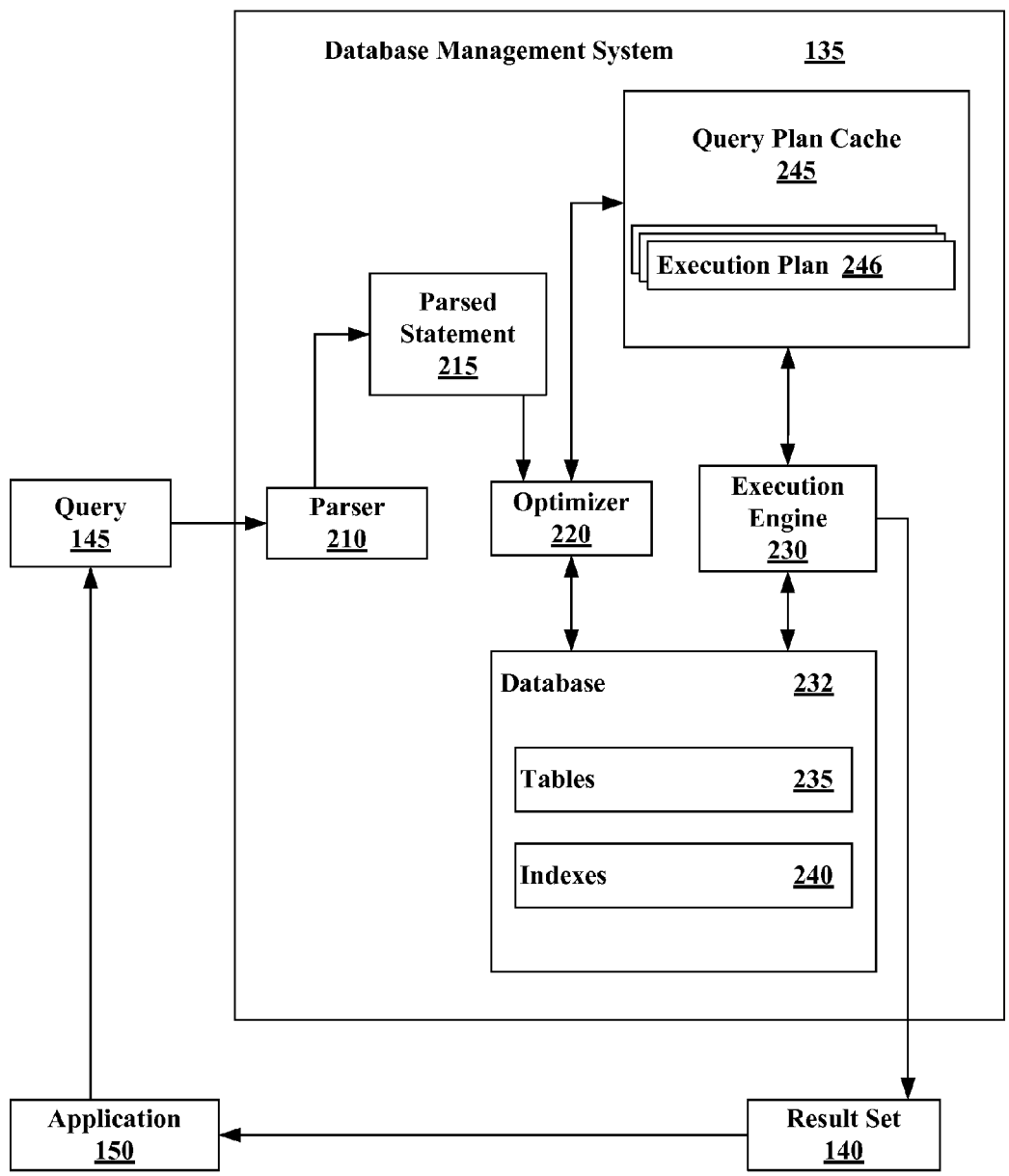
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246, which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
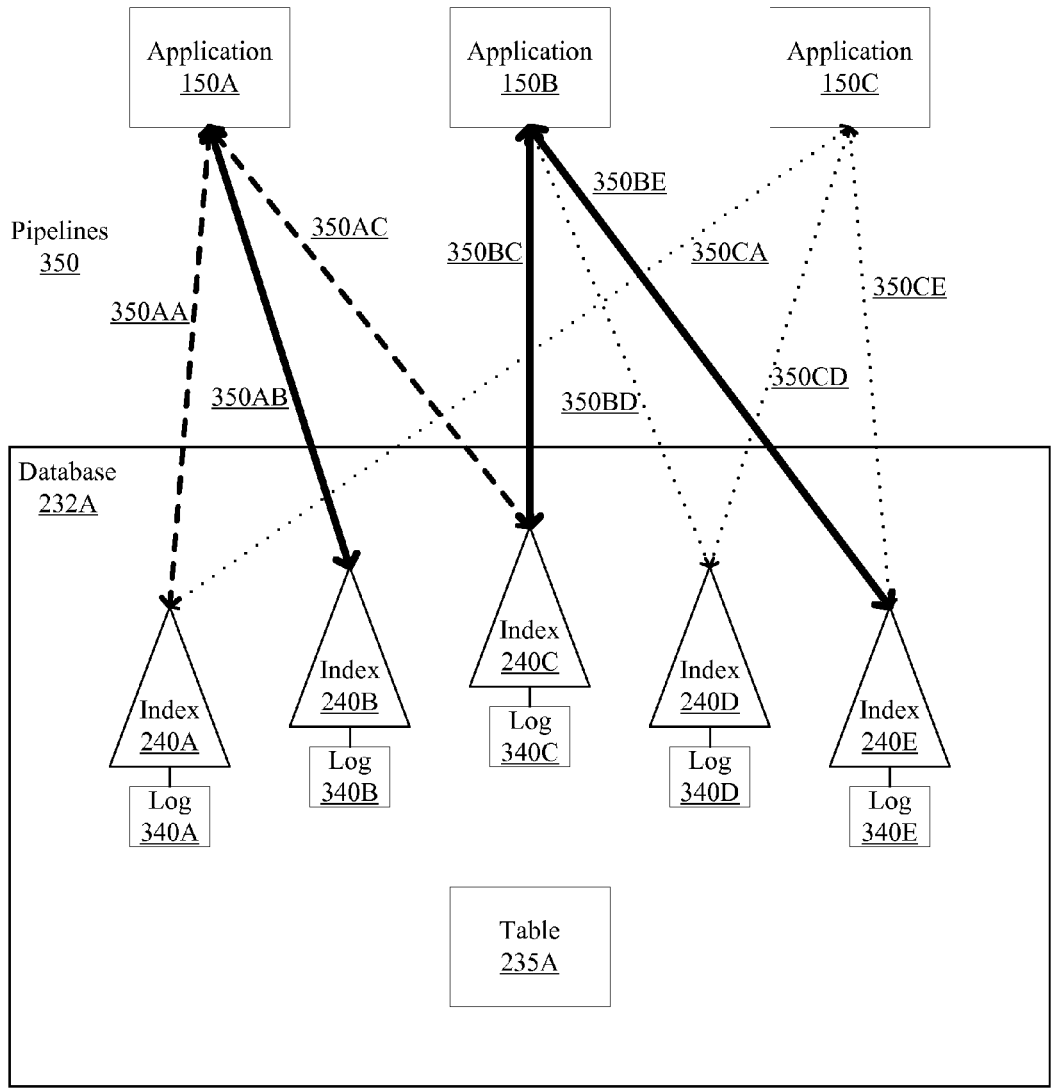
FIG. 3 illustrates an example database and example applications connected by example pipelines according to an embodiment.

FIG. 3 illustrates an example database 232A and example applications 150 connected by example pipelines 350 according to an embodiment. The database 232A may include a table 235A. In embodiments, many rows and many columns may exist in the table 235A. The database 232A may include indexes 240. The indexes 240 may correlate to the table 235A. The indexes 240 may be built over the table 235A. In embodiments, the indexes 240 may improve search times to a desired subset of rows in the table 235A.

The indexes 240 may be maintained to reflect that an entry (i.e. row) has been added, deleted, or changed in the table 235A. In embodiments, applicable indexes 240 over the table 235A may be maintained whenever associated data in the table 235A is added, deleted, or changed. In embodiments, the indexes 240 may order row references into an order based on key columns specified for the particular index such as particular indexes 240A, 240B, 240C, 240D, 240E. Each of indexes 240A, 240B, 240C, 240D, 240E may have a particular key column. Ordering of row references of the indexes 240 may be distinct from an order of rows of the table 235A.

The indexes 240 of the database 232A may be connected to applications 150 by pipelines 350. Application 150A may connect with index 240A via pipeline 350AA. Application 150A may connect with index 240B via pipeline 350AB. Application 150A may connect with index 240C via pipeline 350AC. Application 150B may connect with index 240C via pipeline 350BC. Application 150B may connect with index 240D via pipeline 350BD. Application 150B may connect with index 240E via pipeline 350BE. Application 150C may connect with index 240A via pipeline 350CA. Application 150C may connect with index 240D via pipeline 350CD. Application 150C may connect with index 240E via pipeline 350CE.

Applications 150 may search the indexes 240 via pipelines 350. Pipelines 350 may be open and active such as pipelines 350AB, 350BC, 350BE. Open and active pipelines 350AB, 350BC, 350BE are represented by a solid line in FIG. 3. Open and active pipelines may be associated with indexes being searched 240B, 240C, 240E. In embodiments, a particular open and active pipeline may have a search request that is actively in use associated with the particular application and the particular index connected by the particular open pipeline. Pipelines 350 connecting applications 150 and indexes 240 associated with the search request may be considered open. In embodiments, flow may be data flow. In embodiments, flow related to the particular application may be such that the particular index is being read. Indexes being read may be considered actively in use. In embodiments, at a future time the particular open pipeline may be inactive or closed.

Pipelines 350 may be open and inactive such as pipelines 350AA, 350AC. Open and inactive pipelines 350AA, 350AC are represented by a dashed line in FIG. 3. Open and inactive pipelines may be associated with indexes not being searched 240A when no open and active pipelines are associated with the particular index. In embodiments, a particular open and inactive pipeline may have a search request that is not actively in use associated with the particular application and the particular index connected by the particular open pipeline. Pipelines 350 connecting applications 150 and indexes 240 associated with the search request may be considered open. In embodiments, flow related to the particular application may be such that the particular index is not being read. Indexes not being read may be considered not actively in use. In embodiments, at a future time the particular open pipeline may be active or closed.

Pipelines 350 may be closed (and thus inactive) such as pipelines 350BD, 350CA, 350CD, 350CE. Closed pipelines 350BD, 350CA, 350CD, 350CE are represented by a dotted line in FIG. 3. Closed pipelines may be associated with indexes not being searched 240D when no open and active pipelines are associated with the particular index. In embodiments, a particular closed pipeline may not have a search request associated with the particular application and the particular index connected by the particular closed pipeline. Pipelines 350 connecting applications 150 and indexes 240 not associated with the search request may be considered closed. The particular application and the particular index may lack flow. Lack of flow may indicate not actively in use. In embodiments, at a future time the particular closed pipeline may be opened.

In embodiments, maintaining particular indexes associated with particular open and active pipelines such as pipelines 350AB, 350BC, 350BE may be a higher priority than maintaining particular open and inactive pipelines such as pipelines 350AA, 350AC. In embodiments, maintaining particular indexes associated with particular open and inactive pipelines such as pipelines 350AA, 350AC may be a higher priority than maintaining particular closed pipelines such as pipelines 350BD, 350CA, 350CD, 350CE. In embodiments, maintaining particular indexes associated with particular open and active pipelines such as pipelines 350AB, 350BC, 350BE may be a same priority as maintaining particular open and inactive pipelines such as pipelines 350AA, 350AC. In embodiments, maintaining particular indexes associated with particular open and inactive pipelines such as pipelines 350AA, 350AC may be the same priority as maintaining particular closed pipelines such as pipelines 350BD, 350CA, 350CD, 350CE.

Indexes 240 may be associated with logs 340. Each particular index may be associated with a particular log. Specifically, index 240A may be associated with log 340A. Index 240B may be associated with log 340B. Index 240C may be associated with log 340C. Index 240D may be associated with log 340D. Index 240E may be associated with log 340E. The particular log may enable dynamic logging for the particular index over the table 235A when table row maintenance (e.g., additions, deletions, changes) is in effect. When the particular index is not immediately updated with a maintenance request (i.e. delayed maintenance), the maintenance request may be dynamically added to the particular log for the particular index (i.e. dynamic logging).

The maintenance request update may be performed at a later time. The later time may allow for efficient search performance. The later time may allow for batched updates. Batched updates may include multiple rows being updated in one operation. Batched updates may reduce I/O costs, working set memory sizes, CPU consumption, performance overhead, performance penalties, etc. Batched updates may be useful for data warehouses, data marts, and other reporting servers.

In embodiments, entries in the particular log may be ordered. Ordering may occur as entries are added to the particular log. Ordering may match indicators such as a key, timestamp, etc. Ordering entries in the particular log may increase maintenance or search efficiency when entries in the particular log are added to the particular index. Duplicate entries may be accounted for. For example, an update to a particular row may occur multiple times while the particular row is present in the particular log. In some cases, only the latest update is relevant and needs to be updated in the particular index. Therefore, actual maintenance to the particular index is decreased, potentially having positive implications such as reduced I/O costs, working set memory sizes, CPU consumption, performance overhead, performance penalties, etc.

Figure 4:
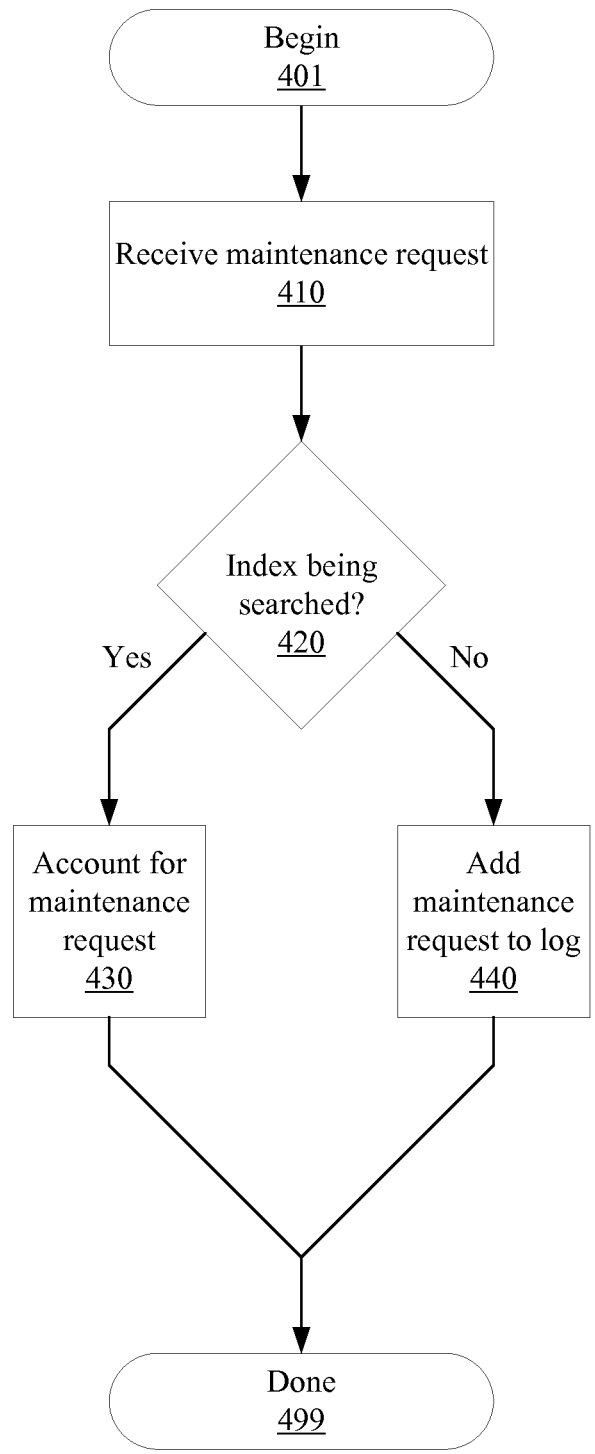
FIG. 4 is a flowchart illustrating an operation to manage a database according to an embodiment.

FIG. 4 is a flowchart illustrating an operation 400 to manage a database according to an embodiment. Operation 400 may begin at block 401. In embodiments, a triggering event may occur. The triggering event may initiate operation 400 at block 401. The triggering event may include a temporal element. For example, the temporal element may include the triggering event occurring at a given time each day when proportionally few searches are requested. The triggering event may include a predictive element which may anticipate a future occurrence. The predictive element may include historical access. The predictive element may include an application coming online. For example, if a group of applications consistently are run in series, predicting a future application coming online may enable anticipating a desire to perform index maintenance.

In embodiments, operation 400 may include determining a size of the log associated with the index. Operation 400 may include reducing delays associated with the size of the log associated with the index. Operation 400 may include setting a maximum log size. In embodiments, index maintenance may be performed once the log reaches a set number of entries. Operation 400 may include leveraging a background daemon to monitor log sizes and automatically perform maintenance upon a log size threshold being reached. Such embodiments may produce a triggering event related to block 401.

In embodiments, operation 400 may include a refresh period of the log associated with the index. Operation 400 may include managing an amount of time the index is not current. Operation 400 may include setting a maximum amount of time the index is not current. In embodiments, index maintenance may be performed after the index is not current for twenty-four hours. Operation 400 may include leveraging a background daemon to monitor the amount of time the index is not current and automatically perform maintenance upon a time threshold being reached. Such embodiments may produce a triggering event related to block 401.

A maintenance request may be received at block 410. The maintenance request may be a result of a table adding, deleting, or changing an entry or row of the table. The maintenance request may be adding a row to a particular index. The maintenance request may be deleting the row from the particular index. The maintenance request may be changing the row of the particular index. In embodiments, changing the row may include a combination of deleting and adding.

A determination is made at block 420 as to whether the particular index is being searched. The particular index may be considered being searched when a particular pipeline is open and active between a particular application and the particular index. In embodiments, a particular open and active pipeline may have a search request that is actively in use associated with the particular application and the particular index connected by the particular open pipeline. Pipelines connecting applications and indexes associated with the search request may be considered open. In embodiments, flow may be data flow. In embodiments, flow related to the particular application may be such that the particular index is being read. Indexes being read may be considered actively in use.

The particular index may be considered not being searched when the particular pipeline is not open and active between the particular application and the particular index. Not open and active may include open and inactive. In embodiments, a particular open and inactive pipeline may have a search request that is not actively in use associated with the particular application and the particular index connected by the particular open pipeline. Pipelines connecting applications and indexes associated with the search request may be considered open. In embodiments, flow related to the particular application may be such that the particular index is not being read. Indexes not being read may be considered not actively in use.

Not open and active may include closed. Closed pipelines may be associated with indexes not being searched when no open and active pipelines are associated with the particular index. In embodiments, a particular closed pipeline may not have a search request associated with the particular application and the particular index connected by the particular closed pipeline. Pipelines connecting applications and indexes not associated with the search request may be considered closed. The particular application and the particular index may lack flow. Lack of flow may indicate not actively in use.

Block 430 may occur when the particular index is being searched. Operation 400 may account for the maintenance request. In embodiments, at least a portion of the particular index may be updated with the maintenance request. Updating at least a portion of the particular index may include adding, deleting, or changing a row of the particular index. The maintenance request may not be entered into a particular log associated with the particular index. Searching may resume or continue. In embodiments, searching may be paused to permit the addition, deletion, or change of the entry or row of the particular index. In embodiments such as when the maintenance request or the particular log is sufficiently small, searching may be divided into two phases. One phase may include searching the particular index. Another phase may include searching the maintenance request or the particular log. Results from the two phases may be merged to achieve a final answer. In other embodiments or technologies, it is contemplated that searching may not be paused or may be paused multiple times.

Block 440 may occur when the particular index is not being searched. The maintenance request may be added to the particular log for the particular index. The particular index may not be immediately updated with the maintenance request. The maintenance request update may be performed at a later time. The later time may allow for batched updates. Batched updates may include multiple rows being updated in one operation. Batched updates may reduce I/O costs, working set memory sizes, CPU consumption, performance overhead, performance penalties, etc. Batched updates may be useful for data warehouses, data marts, and other reporting servers.

In embodiments, entries in the particular log may be ordered. Ordering may occur as entries are added to the particular log. Ordering may match indicators such as a key, timestamp, etc. Duplicate entries may be accounted for. For example, an update to a particular row may occur multiple times while the particular row is present in the particular log. In some cases, only the latest update is relevant and needs to be updated in the particular index. Therefore, actual maintenance to the particular index is decreased, potentially having positive implications such as reduced I/O costs, working set memory sizes, CPU consumption, performance overhead, performance penalties, etc. Operation 400 concludes at block 499.

Operation 400 may promote efficient index maintenance. Operation 400 may make access to indexes more predictable. Operation 400 may include settings automatically determined by a database management system (DBMS). Operation 400 may include settings configured by a user such as a database administrator.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure.

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A system comprising:
    a memory;
    one or more processors; and
    program code including a query optimizer, the program code configured to be executed by the one or more processors to process a database query, the program code configured to:
        structure, using a database management system (DBMS), a database to have a table, an index associated with the table, and a log associated with the index;
        order entries of the log, based on a key;
        receive, with a parser, a maintenance request related to the index;
        determine, with the DBMS, that the index is being searched;
        add, using a batch process, the maintenance request to the log in response to determining that the index is not being searched, determining that the index is not being searched including determining that a pipeline is either closed or open and inactive between an application and the index, wherein the pipeline being open and inactive includes the pipeline being open, but not actively in use by a search request associated with the application and the index, wherein the maintenance request is a change to the index and the maintenance request is used to determine delays in maintenance of index;
        determine, with the DBMS, that the index is being searched; and
        account for the maintenance request, in response to determining that the index is being searched, wherein account for the maintenance request includes update the index with the maintenance request and resume searching.

2. The system of claim 1, wherein the program code is further configured to account for duplicate entries of the log, in response to multiple updates to a row in the log that establish duplicate entries in the log, using only a latest update to decrease actual maintenance on the index.

3. The system of claim 1, wherein the key corresponds to a key column of the index.

4. The system of claim 1, wherein a change to the index is selected from the group consisting of adding, deleting, and changing a row of a particular index.

5. The system of claim 1, wherein the program code is further configured to order entries of the log by matching keys, as entries are added, for efficiency.

6. The system of claim 1, wherein the program code is further configured to:
    initiate the maintenance request, based on a predictive element that uses access history data, to anticipate an application coming online.

7. The system of claim 1, wherein the program code is further configured to:
    establish a log size threshold;
    monitor a size of the log associated with the index;
    determine that the size of the log associated with the index has reached the log size threshold; and
    initiate, in response to determining the size of the log associated with the index has reached the log size threshold, the maintenance request.

8. The system of claim 1, wherein the pipeline being closed includes the pipeline connecting the application and the index not being associated with the search request, and wherein the pipeline being closed includes the pipeline having a lack of data flow.

* * * * *